United States Patent

Kollmeier et al.

Patent Number: 4,687,786
Date of Patent: Aug. 18, 1987

[54] PROCESS FOR THE PREPARATION OF FLEXIBLE POLYURETHANE FOAMS

[75] Inventors: Hans-Joachim Kollmeier, Essen; Rolf-Dieter Langenhagen, Hattingen-Niederwenigern, both of Fed. Rep. of Germany

[73] Assignee: Th. Goldschmidt AG

[21] Appl. No.: 833,957

[22] Filed: Feb. 27, 1986

[30] Foreign Application Priority Data

Mar. 8, 1985 [DE] Fed. Rep. of Germany ....... 3508292

[51] Int. Cl.$^4$ .............................. C08J 9/00; C08J 9/08
[52] U.S. Cl. ..................................... 521/110; 521/112; 556/437; 556/445
[58] Field of Search ................ 521/111, 112; 556/437, 556/445; 528/110

[56] References Cited

U.S. PATENT DOCUMENTS

| | | | |
|---|---|---|---|
| 3,194,773 | 7/1965 | Hostettler | 521/112 |
| 3,280,160 | 10/1966 | Bailey | 521/112 |
| 3,402,192 | 9/1968 | Haluska | 521/112 |
| 3,507,815 | 4/1970 | Bailey et al. | 521/112 |
| 3,637,541 | 1/1972 | Rossmy | 521/111 |
| 3,703,489 | 11/1972 | Morehouse | 521/112 |
| 3,723,491 | 3/1973 | Rossmy et al. | 521/112 |
| 3,979,420 | 9/1976 | Prokai et al. | 521/112 |

*Primary Examiner*—Lucille M. Phynes
*Attorney, Agent, or Firm*—Toren, McGeady & Associates

[57] ABSTRACT

Process for the preparation of flexible polyurethane foams using polysiloxane-polyoxyalkylene block copolymers as stabilizers having the general formula:

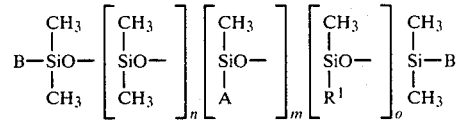

in which
A represents $A^1$ and $A^2$ polyoxyalkylene blocks, as defined hereinafter, which are linked to silicon over carbon and which have the general formula $-R^2-O-(C_xH_{2x}O-)_yR^3$, $R^2$ being a divalent hydrocarbon radical with 2 to 4 carbon atoms and $R^3$, x and y are as defined hereinafter,
B is a methyl radical, the A or $R^1$ radical,
$R^1$ is an alkyl radical with 1 to 12 carbon atoms, a substituted alkyl radical with 1 to 12 carbon atoms, an aryl or an alkaryl radical,
n has a value of 30 to 200,
m has a value of 3 to 20 when B is a methyl radical or corresponds to the $R^1$ radical, and a value of 1 to 18 when B corresponds to the A radical,
o has a value of 0 to 40, n being not less than 5 m, and m and o being not greater than $\frac{1}{3}$ n, with the proviso that
(a) the $A^1$ blocks consist of 30 to 60 weight percent of oxyethylene units, the remainder being oxypropylene units, the $R^3$ radical is a hydrogen radical and the average molecular weight of the $A^1$ Blocks is from 2,500 to 4,500,
(b) the $A^2$ blocks consist of 30 to 80 weight percent of oxyethylene units, the remainder being oxypropylene units, the $R^3$ radical is an alkyl radical with 1 to 4 carbon atoms or an acyl radical, and the average molecular weight of the $A^2$ blocks is from 800 to 2,400, and
(c) the molar ratio of the $A^1$ blocks to the $A^2$ blocks is 20:80 to 60:40, and there is at least one $A^1$ and one $A^2$ block in the average molecule.

The stabilizers are distinguished by exceptionally high stabilizing properties and, when used in flexible polyurethane foams, surprisingly form open cells in spite of the fact that they contain OH-terminated polyoxyalkylene blocks.

21 Claims, No Drawings

PROCESS FOR THE PREPARATION OF FLEXIBLE POLYURETHANE FOAMS

BACKGROUND OF THE INVENTION

1. Field of the Invention

The invention relates to a processs for the preparation of flexible polyurethane foams. These are prepared from polyisocyanates which are at least difunctional and polyols with at least two hydroxyl groups per molecule. The equivalent weight of the polyol per hydroxyl group is about 700 to 1,500. Catalysts, blowing agents, polysiloxane-polyoxyalkylene block copolymers as foam stabilizers, and, optionally other customary additives are also used.

2. Description of the Prior Art

Polyoxyalkylene-polysiloxane block copolymers have been used for a considerable time to stabilize polyurethane foams. These block copolymers are adapted to or modified for the system to be foamed with respect to the structure of the polyoxyalkylene and polysiloxane blocks. The structure and selection of suitable polyoxyalkylene-polysiloxane block copolymer stabilizers is described in extensive literature and in numerous patents which teach those skilled in the art which block copolymers are preferably used in order to prepare polyurethane foams with particular properties.

Representative of such literature in German Pat. No. 16 94 366. This patent relates to a process for the preparation of flexible polyurethane foams from polyethers with, on the average, at least two hydroxyl groups per molecule and organic diisocyanates in the presence of polyoxyalkylene-polysiloxane block copolymers, catalysts, water and/or other blowing agents. The process disclosed is characterized by the fact that use is made of polyoxyalkylene-polysiloxane block copolymers wherein the polysiloxane block is constructed in a known manner and the polyoxyalkylene block is composed of 25 to 70 weight percent of a polyoxyalkylene with an average molecular weight of 1,600 to 4,000 and an ethylene oxide content of 20 to 100 weight percent, the remainder being propylene oxide, and, optionally, higher molecular weight alkylene oxides; and 30 to 75 weight percent of a polyoxyalkylene with an average molecular weight of 400 to 1,200 and an ethylene oxide content of 65 to 100 weight percent, the remainder being propylene oxide and, optionally, higher molecular weight alkylene oxides.

Accordingly, this patent essentially discloses that the polyoxyalkylene blocks contained in the block copolymer are not identical, but rather that the block copolymer consists of two different types of combined polyoxyalkylene blocks which differ in their average molecular weight and in the ethylene oxide/propylene oxide content. Due to this gradation of the hydrophilic/hydrophobic behavior within the molecule, the block copolymer achieves special surfactant properties by means of which the technical requirements for polyurethane foam stabilizations are particularly well met. Specifically, the block copolymers meet the requirements for a stabilizer for polyurethane foams, namely, they nucleate the gas bubbles, emulsify otherwise immiscible raw materials, and stabilize the rising foam against collapse and against coalescence that leads to coarsening of the cells. In flexible foams, they additionally cause the cells to open up after the foam has reached the maximum height.

U.S. Pat. No. 3,402,192 describes copolymers which are suitable for use as foam stabilizers and correspond to one of the following structural formulas $$R_aSi[(OSiMe_2)_n(OSiMeG)_dOSiMe_2G]_{4-1} \quad (1)$$

$$GMe_2Si(OSiMe_2)_n(OSiMeG)_bOSiMe_2G, \quad (2)$$

$$Me_3Si(OSiMe_2)_n(OSiMeG)_cOSiMe_3, \quad (3)$$

$$R_aSi[(OSiMe_2)_n(OSiMeG)_cOSiMe_3]_{4-1}. \quad (4)$$

In these formulas, R represents a hydrocarbon radical with 1 to 10 carbon atoms which are free of aliphatic double bonds. Me is a methyl radical. G is a radical having the formula $-D(OR'')_mA$, D being an alkyl radical. R'' is formed by ethylene, propylene or butylene radicals, the ratio of the ethylene radicals to the other alkylene radicals is determined by the ratio of carbon atoms to oxygen atoms in the OR'' radical and is from 2.3:1 to 2.8:1. On the average, m has a value of 25 to 100. A is one of the radicals $-OR'$, $-OOCR'$ or

the R' radical being a hydrocarbon radical or a hydrocarbonoxy radical without aliphatic double bonds and the A radical comprising fewer than 11 atoms altogether. "a" has an average value of 0 to 1, n has an average value of 6 to 420, d has an average value of 0 to 30, b has an average value of 1 to 30, and c has an average value of 3 to 30. At least 13 weight percent of the copolymer should consist of dimethylsiloxy units. The block copolymers of the U.S. Pat. No. 3,402,192 are said to have good cell opening properties for flexible polyurethane foams.

If the oxyalkyl or oxyacyl groups which terminate the oxyalkylene blocks of the above-described polyoxyalkylene-polysiloxane block copolymers are replaced by hydroxyl groups, stabilizers with an increased stabilizing action are obtained. It turns out, however, that as the replacement of the inert groups by hydroxyl groups is increased, flexible polyurethane foams are obtained wherein the proportion of closed cells increases. If the terminal groups are replaced completely by hydroxy groups, flexible polyurethane foams are obtained which are largely closed-celled. This effect is described, for example, in the journal "Plaste und Kautschuk" 30 (1983), pages 367 ff.

SUMMARY OF THE INVENTION

We have discovered stabilizers which are suitable for the preparation of flexible polyurethane foams and have the outstanding foam-stabilizing properties of polyoxyalkylene-polysiloxane block copolymers that contain such hydroxyl groups but lead to flexible polyurethane foams which are open-celled.

More particularly, we have found that this combination of properties is achieved by using as the polysiloxane-polyoxyalkylene block copolymers, those having the general formula:

$$\text{B}-\underset{\underset{\text{CH}_3}{|}}{\overset{\overset{\text{CH}_3}{|}}{\text{SiO}}}-\left[\underset{\underset{\text{CH}_3}{|}}{\overset{\overset{\text{CH}_3}{|}}{\text{SiO}}}-\right]_n\left[\underset{\underset{\text{A}}{|}}{\overset{\overset{\text{CH}_3}{|}}{\text{SiO}}}-\right]_m\left[\underset{\underset{\text{R}^1}{|}}{\overset{\overset{\text{CH}_3}{|}}{\text{SiO}}}-\right]_o\underset{\underset{\text{CH}_3}{|}}{\overset{\overset{\text{CH}_3}{|}}{\text{Si}}}-\text{B}$$

in which

A represents $A^1$ and $A^2$ polyoxyalkylene blocks, as defined hereinafter, which are linked to silicon over carbon and which have the general formula $-R^2-O-(C_xH_{2x}O-)_yR^3$, $R^2$ being a divalent hydrocarbon radical with 2 to 4 carbon atoms and $R^3$, x and y are as defined hereinafter, B is a methyl radical, the A or $R^1$ radical, $R^1$ is an alkyl radical with 1 to 12 carbon atoms, a substituted alkyl radical with 1 to 12 carbon atoms, an aryl or alkaryl radical, n has a value of 30 to 200, m has a value of 3 to 20 when B is a methyl radical or corresponds to the $R^1$ radical, and a value of 1 to 18 when B corresponds to the A radical, o has a value of 0 to 40, n being not less than 5m, and m and o being not greater than ⅓ n, with the proviso that (a) the $A^1$ blocks consist of 30 to 60 weight percent of oxyethylene units, the remainder being oxypropylene units, the $R^3$ radical is a hydrogen radical and the average molecular weight of the $A^1$ Blocks is from 2,500 to 4,500, (b) the $A^2$ blocks consist of 30 to 80 weight percent of oxyethylene units, the remainder being oxypropylene units, the $R^3$ radical is an alkyl radical with 1 to 4 carbon atoms or an acyl radical, and the average molecular weight of the $A^2$ blocks is from 800 to 2,400, and (c) the molar ratio of the $A^1$ blocks to the $A^2$ blocks is 20 : 80 to 60 : 40, and there is at least one $A^1$ and one $A^2$ block in the average molecule.

DESCRIPTION OF THE PREFERRED EMBODIMENTS

As is evident from Formula I, the oxyalkylene blocks in the block copolymers are linked laterally to the polysiloxane chain and, optionally, at one or both of its ends. Moreover, it is an essential characteristic of the invention that a mixture of polyoxyalkylene radicals of different average molecular weights is linked to the polysiloxane chain. These two different polyoxyalkylene blocks may be the same or different with respect to the limits of the oxypropylene/oxyethylene ratio. Of particular importance, however, is the condition that the $A^1$ polyoxyalkylene blocks which have an average molecular weight of 2,500 to 4,500, have a terminal hydroxyl group, while the other $A^2$ polyoxyalkylene blocks which have an average molecular weight of 800 to 2,400, have a terminal $OR^3$ group, $R^3$ being an alkyl radical with 1 to 4 carbon atoms or an acyl radical. As the alkyl radical, the methyl or butyl radical is especially preferred. It may, however, also be an ethyl or a propyl radical. The $R^3$ radical may also be branched. As the acyl radical, the radical of a lower molecular weight carboxylic acid, especially of acetic acid, is especially preferred.

B is a methyl radical or the A or $R^1$ radical. In this connection, $R^1$ represents an alkyl radical with 1 to 12 carbon atoms, an aryl radical or an alkaryl radical. As alkyl radicals, the linear alkyl radicals are especially preferred. A preferred aryl radical is the phenyl radical. As the alkaryl radical, the phenylethylene radical is preferred. The $R^1$ radicals optionally may be substituted. As substituents, especially halogen atoms or pseudohalogen radicals, preferably chlorine atoms or cyano radicals, may be used.

The subscripts have the following meanings:

n = 30 to 200, and preferably is 50 to 150.

m = 3 to 20, and preferably is 3 to 15 when B is a methyl radical or corresponds to the $R^1$ radical. However, if B corresponds to the A radical, the value of m is from 1 to 18, and preferably, from 1 to 13.

o has a value of 0 to 40, and preferably, 0 to 20.

The values of the subscripts are mutually linked, insofar as n must not be less than 5 m and o must not be greater than ⅓ n.

The values of the x and y subscripts result from the definitions of the polyoxyalkylene blocks $A^1$ and $A^2$. The value of x corresponds to the molar ratio of oxyethylene to oxypropylene units. For a molar ratio of 1:1, x=2.5. For a molar ratio of 1:3, the value of x is 2.75. The value of y is determined by the molecular weight of the polyoxyalkylene block and the x value of this block. For example, if the molecular weight of the polyoxyalkylene block is 3,000, and the oxyethylene and oxypropylene units are present in equal molar proportions, that is, if x=2.5, then y=58.8. In the $A^1$ and $A^2$ polyoxyalkylene blocks, the oxyethylene and oxypropylene units may be distributed randomly or arranged in blocks.

The stabilizers used in accordance with the invention are distinguished by their exceptionally high stabilizing properties, open cells unexpectedly being formed when the stabilizers are used in flexible polyurethane foams, despite the fact that these stabilizers contain OH-terminated polyoxyalkylene blocks.

In view of the above-mentioned state of the art, this behavior was surprising to those skilled in the art, who would have expected the foams to become significantly less open celled.

The synthesis of the block copolymers used in the inventive process is accomplished in a known manner, reference being made in this connection to U.S. Pat. No. 3,637,541 and especially to German Pat. No. 31 33 869.

The starting products for the synthesis of the inventive block copolymers are polysiloxanes of the general formula I, in which the A and, optionally, the B radicals are hydrogen atoms, which are reacted with polyethers A, the $R^2$ radical of which is replaced by the $CH_2=CH-(CH_2)_q$-radical, q being 0, 1 or 2. The addition reaction preferably is carried out in the presence of platinum catalysts and, optionally, in the presence of an inert solvent, at temperatures ranging from 50° to 180° C.

The invention is illustrated by the following examples.

EXAMPLE 1

Starting out from an SiH functional polysiloxane of the composition:

$$(CH_3)_3SiO-[(CH_3)_2SiO-]_{63.3}\left[\underset{\underset{H}{|}}{\overset{\overset{CH_3}{|}}{Si}}O-\right]_{4.7}Si(CH_3)_3,$$

block copolymers are synthesized by an addition reaction with the following polyether mixtures, and evaluated as foam stabilizers.

Polyether Mixture I
40 mole percent of $CH_2=CH-CH_2-(OC_2H_4-)_{4.1}(OC_3H_6-)_{31}OCH_3$
60 mole percent of $CH_2=CH-CH_2-(OC_2H_4-)_{1.7}(OC_3H_6-)_{13}-1\ OCH_3$
gives stabilizer A (comparison).

Polyether Mixture II
40 mole percent of $CH_2=CH-CH_2-(OC_2H_4-)_{4.1}(OC_3H_6-)_{31}OH$
60 mole percent of $CH_2=CH-CH_2-(OC_2H_4-)_{1.7}(OC_3H_6-)_{13}OH$
gives stabilizer B (comparison).

Polyether Mixture III
40 mole percent of $CH_2=CH-CH_2-(OC_2H_4-)_{3.1}OH = A^1$
60 mole percent of $Ch_2=CH-CH_2-(OC_2H_6-)_{1.3}OCH_3 = A^2$
gives stabilizer C (block copolymer in accordance with the invention).

The block copolymers A, B and C are clear, water soluble liquids with the following viscosities:
Stabilizer A: 2,900 mPa×sec. at 20° C.
Stabilizer B: 8,500 mPa×sec. at 20° C.
Stabilizer C: 4,400 mPa×sec. at 20° C.

The three products are tested as stabilizers in the following flexible polyurethane foam formulation at different concentrations under customary process conditions. In addition, the two stabilizers D and E of the state of the art are included in the test.

Stabilizer D according to German Pat. No. 16 94 366, Example 1, substance C.

Stabilizer E, according to U.S. Pat. No. 3,402,192 (a commercial product of Dow Corning Company, known as DC 190).

| Foam Formulation I | Parts by Weight |
| --- | --- |
| polyoxypropylenetriol (OH number 56) | 100 |
| water | 4.8 |
| methylene chloride | 15 |
| tin(II) octoate | 0.4 |
| triethylenediamine | 0.1 |
| dimethylethanolamine | 0.15 |
| stabilizer | 0.8 or 1.2 |
| toluene diisocyanate (80/20 2.4/2.6 isomer mixture) | 58.9 |

The results are shown in Table 1.

spect to foam volume and the tendency to collapse after rising, but also lead to open-celled foams.

EXAMPLE 2

Starting out from an SiH-functional polysiloxane having the composition

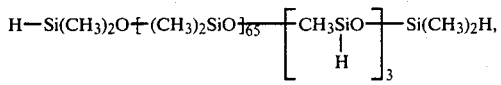

block polymers are synthesized by an addition reaction with the following polyether mixtures, and evaluated as foam stabilizers.

Polyether Mixture IV
50 mole percent of $CH_2=CH-CH_2-(OC_2H_4-)_{4.1}(OC_3H_6-)_{31}OCH_3$
50 mole percent of $CH_2=CH-CH_2-(OC_2H_4-)_{1.7}(OC_3H_6-)_{10}OCH_3$
gives stabilizer F (for comparison).

Polyether Mixture V
50 mole percent of $CH_2=CH-CH_2-(OC_2H_4-)_{4.1}(OC_3H_6-)_{31}OH$
50 mole percent of $CH_2=CH-CH_2-(OC_2H_4-)_{1.7}(OC_3H_6-)_{10}OH$
gives stabilizer G (for comparison).

Polyether Mixture VI
50 mole percent of $CH_2=CH-CH_2-(OC_2H_4-)_{4.1}(OC_3H_6-)_{31}OH = A^1$
50 mole percent of $CH_2=CH-CH_2-(OC_2H_4-)_{1.7}(OC_3H_6-)_{10}OCH_3 = A^2$
gives stabilizer H (in accordance with the invention).

The block copolymers F, G and H obtained, are clear, water soluble liquids with the following viscosities.
Stabilizer F: 3,100 mPa×sec. at 20° C.
Stabilizer G: 9,050 mPa×sec. at 20° C.
Stabilizer H: 4,800 mPa×sec. at 20° C.

The three products are evaluated as stabilizers in the following flexible polyurethane foam formulation under customary process conditions. Stabilizers D and E represent the state of the art and are used for comparison.

| Foam Formulation II | Parts by Weight |
| --- | --- |
| polyoxyalkylenetriol (OH number 48, ratio PO:EO = 88:12) | 100 |
| water | 4.5 |
| trichlorofluoromethane | 18 |
| tin(II) octoate | 0.2 |
| triethylenediamine | 0.08 |

TABLE 1

| Stabilizer | Stabilizer Concentration parts by wt/ 100 parts by wt of polyol | Foam Height in cm | Relative Density in kg/m³ | Collapse in cm | Open Cell Character |
| --- | --- | --- | --- | --- | --- |
| A comparison | 1.2 | 37 | 15.6 | 1.8 | good |
|  | 0.8 | 34 | 16.3 | 3.0 | good |
| B comparison | 1.2 | 39 | 14.6 | 0.3 | closed |
|  | 0.8 | 36 | 15.3 | 0.5 | closed |
| C inventive | 1.2 | 38 | 14.9 | 0.5 | average |
|  | 0.8 | 36 | 15.6 | 0.9 | good |
| D comparison | 1.2 | 36 | 15.9 | 2.3 | good |
|  | 0.8 | 34 | 16.6 | 3.8 | very good |
| E comparison | 1.2 | 37 | 15.5 | 2.0 | average |
|  | 0.8 | 35 | 16.1 | 3.2 | good |

The results show that the stabilizers of the invention not only give improved stabilizing properties with re- -continued

| Foam Formulation II | Parts by Weight |
|---|---|
| dimethylethanolamine | 0.15 |
| stabilizer | 0.6 |
| toluene diisocyanate (80/20 2.4/2.6 isomer mixture) | 55.8 |

The results obtained are shown in Table 2.

TABLE 2

| Stabilizer | Stabilizer Concentration parts by wt/ 100 parts by wt of polyol | Foam Height in cm | Relative Density in kg/m$^3$ | Collapse in cm | Open Cell Character |
|---|---|---|---|---|---|
| F comparison | 0.6 | 34 | 17.0 | 2.0 | good |
| G comparison | 0.6 | 36 | 16.0 | 0.3 | closed |
| H inventive | 0.6 | 35 | 16.2 | 0.8 | good |
| D comparison | 0.6 | 33 | 17.4 | 2.8 | very good |
| E comparison | 0.6 | 34 | 16.9 | 1.7 | average - good |

The results demonstrate that, compared to the products of the state of the art, the inventive stabilizers lead to a greater foam height and therefore to more foam volume, as well as to less collapse and still produce open-celled foams.

We claim:

1. In a process for the preparation of flexible polyurethane foams by reacting at least difunctional polyisocyanates, polyols with at least two hydroxyl groups per molecule, the equivalent weight of which per hydroxyl group is about 700 to 1,500, in the presence of catalysts, blowing agents and foam stabilizers composed of polysiloxane-polyoxyalkylene block copolymers, the improvement which comprises the polysiloxane-polyoxyalkylene block copolymers having the formula:

$$B-\underset{CH_3}{\underset{|}{SiO}}-\left[\underset{CH_3}{\underset{|}{\underset{|}{SiO}}}-\right]_n\left[\underset{A}{\underset{|}{\underset{|}{SiO}}}-\right]_m\left[\underset{R^1}{\underset{|}{\underset{|}{SiO}}}-\right]_o\underset{CH_3}{\underset{|}{Si}}-B$$

wherein
A represents A$^1$ and A$^2$ polyoxyalkylene blocks which are linked to silicon over carbon and which have the formula $$-R^2-O-(C_xH_{2x}O-)_yR^3,$$

R$^2$ being a divalent hydrocarbon radical with 2 to 4 carbon atoms,
B is a methyl radical, the A or the R$^1$ radical,
R$^1$ is an alkyl radical with 1 to 12 carbon atoms, a substituted alkyl radical with 1 to 12 carbon atoms, an aryl or an alkaryl radical,
n has a value of from 30 to 200,
m has a value of 3 to 20 when B is methyl or the R$^1$ radical, and a value of 1 to 18, if B corresponds to the A radical,
o has a value of 0 to 40, wherein
n is not less than 5 m, and o is not greater than ⅓ n, with the proviso that
(a) the A$^1$ blocks consist of 30 to 60 weight percent of oxyethylene units, the remainder being oxypropylene units, the R$^3$ radical is a hydrogen radical and x and y are such that the average molecular weight of the A$^1$ blocks is from 2,500 to 4,500,
(b) the A$^2$ blocks consist of 30 to 80 weight percent of oxyethylene units, the remainder being oxypropylene units, the R$^3$ radical is an alkyl radical with 1 to 4 carbon atoms or an acyl radical and x and y are such that the average molecular weight of the A$^2$ blocks is from 800 to 2,400, and
(c) the molar ratio of the A$^1$ blocks to the A$^2$ blocks is 20:80 to 60:40, and there is at least one A$^1$ and one A$^2$ block in the average molecule.

2. The process of claim 1 wherein for the polysiloxane-polyoxyalkylene block copolymers R$^1$ is a methyl radical,
R$^2$ is a —CH$_2$CH$_2$CH$_2$-radical,
n is from 50 to 150,
m is from 3 to 15, when B is a methyl radical and from 1 to 13 when B represents the A radical, and
o is 0 to 20.

3. The process of claim 1 wherein R$^3$ is a branched alkyl.

4. The process of claim 1 wherein R$^3$ is methyl or butyl.

5. The process of claim 1 wherein R$^3$ is a radical of a lower molecular weight carboxylic acid.

6. The process of claim 5 wherein the carboxylic acid is acetic acid.

7. The process of claim 1 wherein R$^1$ is a linear alkyl radical or a substituted linear alkyl radical and o is greater than zero.

8. The process of claim 1 wherein R$^1$ is phenyl or substituted phenyl and o is greater than zero.

9. The process of claim 1 wherein R$^1$ is phenylethylene or substituted phenylethylene and o is greater than zero.

10. The process of claim 7 wherein the substituents are halogen atoms or pseudohalogen radicals.

11. The process of claim 8 wherein the substituents are halogen atoms or pseudohalogen radicals.

12. The process of claim 9 wherein the substituents are halogen atoms or pseudohalogen radicals.

13. The process of claim 7 wherein the substituents are chlorine atoms or cyano radicals.

14. The process of claim 9 wherein the substituents are chlorine atoms or cyano radicals.

15. The process of claim 1 wherein n is from 50 to 50.

16. The process of claim 1 wherein m is 3 to 15 and B is methyl or the R$^1$ radical.

17. The process of claim 1 wherein m is 1 to 18 and B is the A radical.

18. The process of claim 17 wherein m is 1 to 13.

19. The process of claim 1 wherein o is 0 to 20.

20. A stabilizer comprising polysiloxane-polyoxyalkylene block copolymers having the formula:

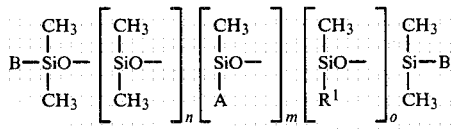

wherein

A represents $A^1$ and $A^2$ polyoxyalkylene blocks which are linked to silicon over carbon and which have the formula $$-R^2-O-(C_xH_{2x}O-)_yR^3,$$

$R^2$ being a divalent hydrocarbon radical with 2 to 4 carbon atoms,

B is a methyl radical, the A or the $R^1$ radical, $R^1$ is an alkyl radical with 1 to 12 carbon atoms, a substituted alkyl radical with 1 to 12 carbon atoms, an aryl or an alkyarlyl radical, n has a value of from 30 to 200, m has a value of 3 to 20 when B is methyl the $R^1$ radical, and a value of 1 to 18, if B corresponds to the A radical, o has a value of 0 to 40, wherein n is not less than 5 m, and 0 is not greater than $\frac{1}{3}$ n, with the proviso that (a) the $A^1$ blocks consist of 30 to 60 weight percent of oxyethylene units, the remainder being oxypropylene units, the $R^3$ radical is a hydrogen radical and x and y are such that the average molecular weight of the $A^1$ blocks is from 2,500 to 4,500, (b) the $A^2$ blocks consist of 30 to 80 weight percent of oxyethylene units, the remainder being oxypropylene units, the $R^3$ radical is an alkyl radical with 1 to 4 carbon atoms or an acyl radical and x and y are such that the average molecular weight of the $A^2$ blocks is from 800 to 2,400, and (c) the molar ratio of the $A^1$ blocks to the $A^2$ blocks is 20:80 to 60:40, and there is at least one $A^1$ and one $A^2$ block in the average molecule.

21. The stabilizer of claim 20 wherein $R^1$ is a methyl radical, $R^2$ is a $-CH_2CH_2CH_2-$ radical, n is from 50 to 150, m is from 3 to 15, when B is a methyl radical and from 1 to 13 when B represents the A radical, and o is 0 to 20.

* * * * *